United States Patent [19]
Castle

[11] Patent Number: 5,341,486
[45] Date of Patent: Aug. 23, 1994

[54] AUTOMATICALLY VARIABLE MEMORY INTERLEAVING SYSTEM

[75] Inventor: David E. Castle, Alhambra, Calif.

[73] Assignee: Unisys Corporation, Blue Bell, Pa.

[21] Appl. No.: 263,569

[22] Filed: Oct. 27, 1988

[51] Int. Cl.$^5$ ............................................. G06F 12/06
[52] U.S. Cl. ...................................... 395/425; 395/400;
364/DIG. 1; 364/245; 364/246; 364/246.4;
364/254; 364/254.4; 364/238.4
[58] Field of Search ................ 364/200, 900; 395/400,
395/425; 365/230.04

[56] References Cited

U.S. PATENT DOCUMENTS

| | | | |
|---|---|---|---|
| 3,806,881 | 4/1974 | Miwa et al. | 395/400 |
| 3,958,222 | 5/1976 | Messina et al. | 395/425 |
| 4,280,176 | 7/1981 | Tan | 395/425 |

OTHER PUBLICATIONS

Gustafson et al., "Memory-Mapped VLSI and Dynamic Interleave Improve Performance," *Computer Design*, Nov. 1, 1985.

M. Lehman, "Variable Memory Structure," IBM Technical Disclosure Bulletin, vol. 9 No. 9 Feb. 1967, pp. 1180–1181.

*Primary Examiner*—Paul V. Kulik
*Attorney, Agent, or Firm*—Nathan Cass; Mark T. Starr

[57] ABSTRACT

An automatically variable memory interleaving system which provides different interleaving factors for particular groups of memory modules dependent upon the number of operable modules present in the system. In a particular preferred embodiment, the interleaving factor is determined for the module containing the address corresponding to the applied memory address, and this interleaving factor is then used to select particular bits of the applied memory address for determining the module to be enabled and the module address.

7 Claims, 5 Drawing Sheets ced in different modules, and then accessing the modules in an interleaved manner. As a result, the total time required to access a sequence of memory locations can be much reduced, since several memory accesses may be overlapped by a high-speed data processor. Two-way and four-way interleaving are common. More specific information regarding such interleaving can be found in *Encyclopedia of Computer Science and Engineering*, Anthony Ralston, Editor, Second Edition, pages 791-792.

AUTOMATICALLY VARIABLE MEMORY INTERLEAVING SYSTEM

BACKGROUND AND SUMMARY OF THE INVENTION

This invention relates to improved means and methods for accessing data stored in a computer memory, and more particularly to improved means and methods for providing interleaving for a system employing a plurality of memory modules.

It is well known in the art that, in a computer system employing a plurality of memory modules, the speed of memory accessing can be significantly increased by arranging for the storing of sequential memory addresses in different modules, and then accessing the modules in an interleaved manner. As a result, the total time required to access a sequence of memory locations can be much reduced, since several memory accesses may be overlapped by a high-speed data processor. Two-way and four-way interleaving are common. More specific information regarding such interleaving can be found in *Encyclopedia of Computer Science and Engineering*, Anthony Ralston, Editor, Second Edition, pages 791-792.

A problem presented by presently known interleaved memory accessing systems is that the granularity of interleaving is predetermined and fixed. Thus, when additional modules are added, they have to be added in multiples of the interleaving. For example, if 4-way interleaving is employed, additional modules have to be added in multiples of four. This can be expensive to a customer who may actually need only one additional module. On the other hand, a system having eight memory modules, would lose half of its memory if one module failed. This problem is compounded by the fact that, today, memory modules are typically provided in a package containing multiple modules, four modules per package being typical. Thus, in a system having fixed interleaving, an entire multiple-module package would have to be changed if only one module fails.

Accordingly, it is a broad object of the present invention to provide improved means and methods for providing memory interleaving in a system having a plurality of memory modules.

Another object of the invention is to provide an interleaved memory module system in which interleaving among modules is automatically variable dependent upon the number of modules in the system.

A further object of the invention is to provide an interleaved memory module system which at all times is able to make use of all operable memory modules.

A still further object of the invention is to provide an interleaved memory module system in which the failure of a memory module in a package does not prevent use of the other modules in the package.

Yet another object of the invention is to provide the objects of the foregoing objects in a relatively simple and inexpensive manner.

The above objects are accomplished in a particular preferred embodiment of the invention by providing for automatic, variable, interleaved addressing of a plurality of memory modules operable to automatically vary the interleaving of particular ones of the modules dependent upon the number of operable memory modules present in the system.

The specific nature of the invention as well as other objects, features, advantages and uses of the invention will become evident from the following description of a preferred embodiment of the invention in conjunction with the accompanying drawings.

DESCRIPTION OF A PREFERRED EMBODIMENT

Like numerals and characters designate like elements throughout the figures of the drawings.

Figure 1:
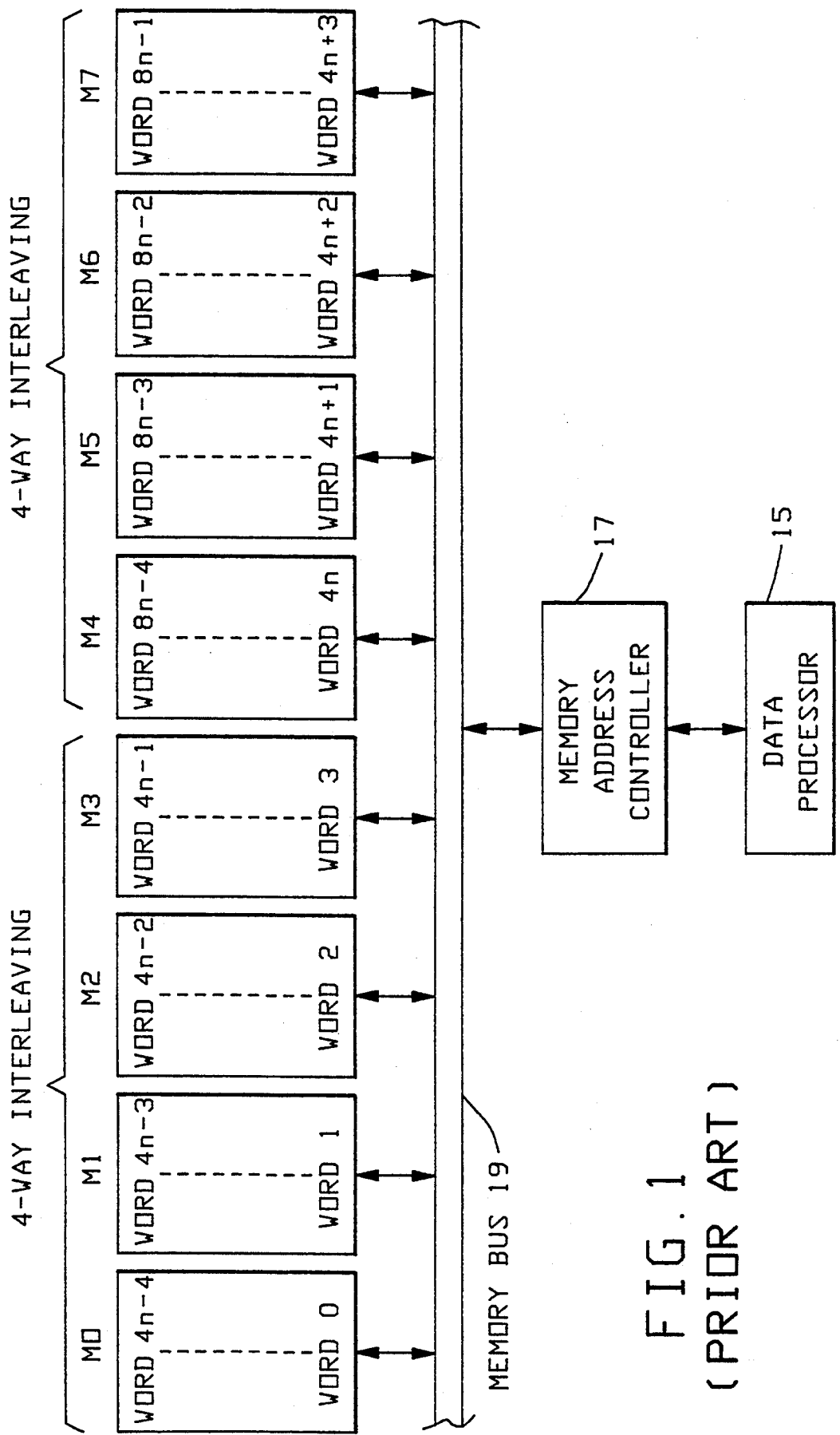
FIG. 1 is an electrical block and schematic diagram of a prior art system employing memory interleaving.
Figure 2:
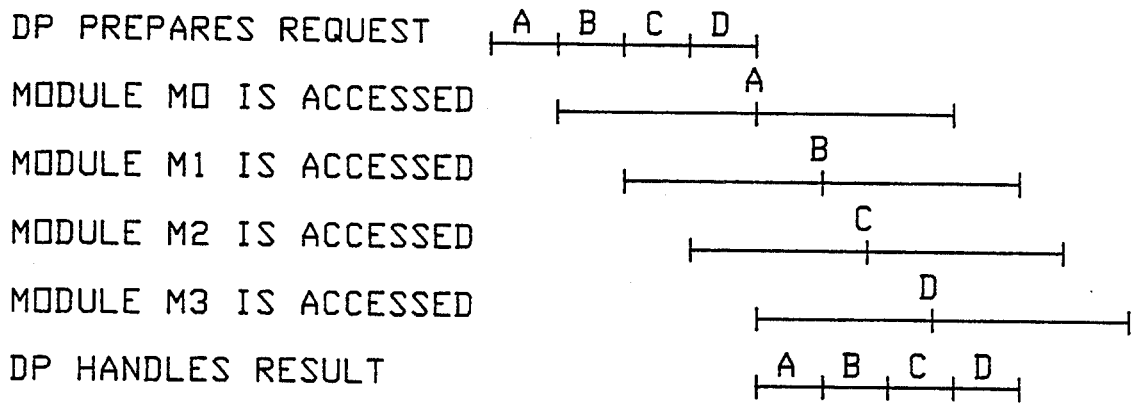
FIG. 2 is a series of graphs illustrating the operation of FIG. 1.

Referring initially to FIG. 1, illustrated therein is an electrical block and schematic diagram illustrating a typical manner in which interleaving is conventionally provided for a plurality of eight memory modules M0, M1, M2, M3, M4, M5, M6, and M7 which interface with a data processor (DP) 15 via a memory module controller 17 and a memory bus 19 (the memory module controller 17 could be incorporated in the data processor 15). FIG. 1 illustrates, for example, a 4-way interleaving arrangement wherein sequential words are stored in different modules. Typical conventional operation is such that data processor addressing requests for sequential words are applied to the memory addressing controller 17 which in turn enables and appropriately addresses a different memory module on every cycle. Thus, sequential words can be accessed on successive cycles without having to wait the several cycles typically required for accessing a memory module. This is illustrated by the graphs of FIG. 2 which shows the data processor (DP) requesting sequential words A, B, C, and D from memory modules M0, M1, M2, and M3, respectively, during consecutive cycles.

In a conventional 4-way memory interleaving arrangement, such as illustrated in FIG. 1, additional memory modules have to be added in groups of four, since there is no provision for varying the interleaving. This is required even if only one more memory module is needed. Furthermore, a failure of one memory module will prevent the associated three memory modules from being used.

Figure 3:
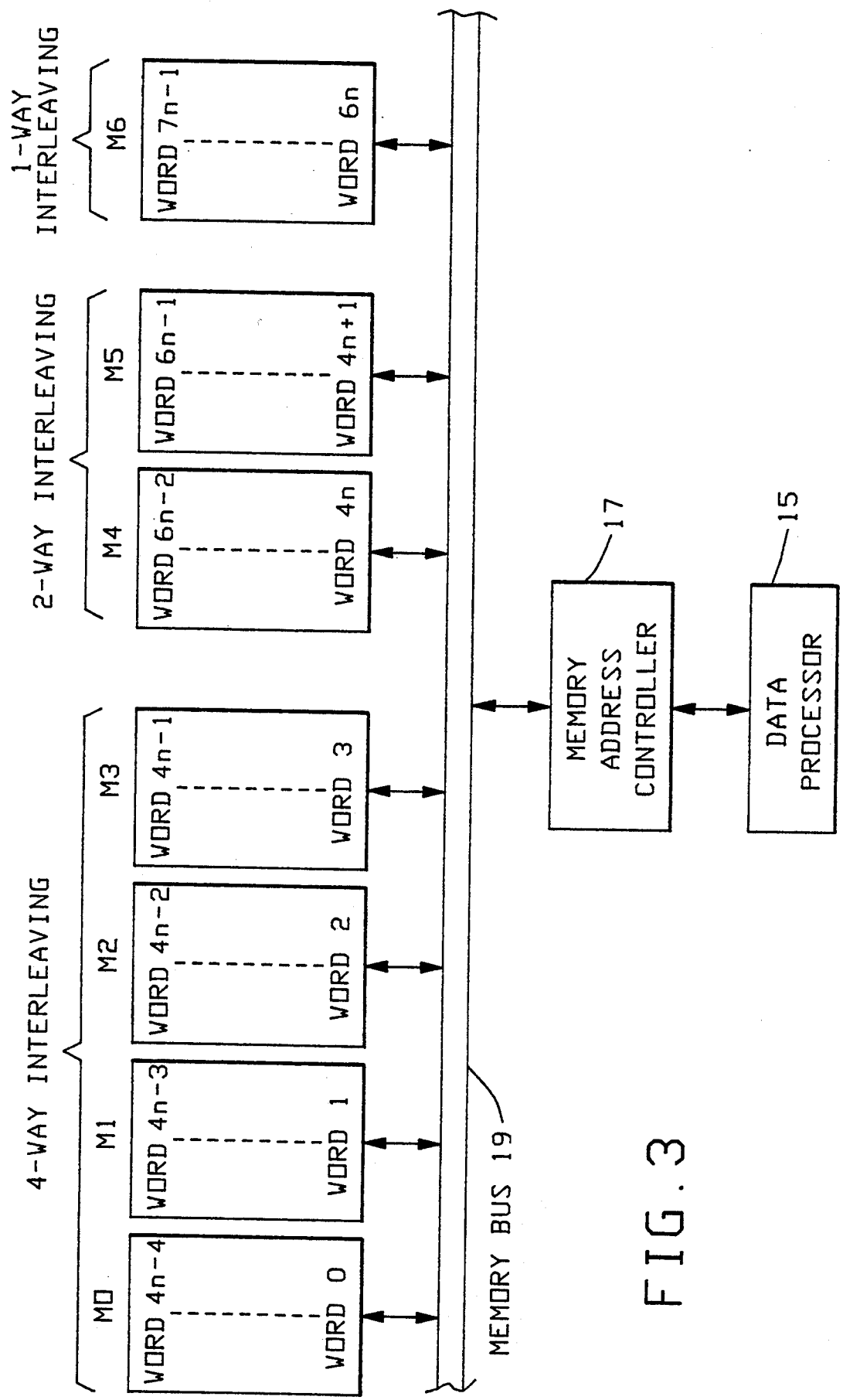
FIG. 3 is an electrical block and schematic diagram illustrating a particular preferred embodiment of a memory system employing variable interleaving in accordance with the invention.

FIG. 3 illustrates the basic manner in which automatically variable interleaving of a plurality of memory modules is provided in accordance with the invention. FIG. 3 shows an arrangement comprised of seven memory modules M0, M1, M2, M3, M4, M5, and M6, wherein the first four modules M0, M1, M2, and M3, have 4-way interleaving, the next two modules M4 and M5 have 2-way interleaving, and the last module M6 has 1-way interleaving (that is, no interleaving). It will thus be understood that the particular interleaving provided is variable depending on the number of memory modules provided. For example, if there were nine memory modules, the first four modules and the second four modules would have 4-way interleaving, and the remaining memory module would not be interleaved.

Typically, the data processor 15 provides an absolute memory address to the memory module controller 17. This absolute address ranges from zero to the maximum address available to the system, as determined by the number of operable memory modules. As is conventional, during initiation operations which typically follow turn-on, the data processor 15 determines the identity and total number of operable memory modules in the system. For the purposes of this description, it will be assumed that all of the seven memory modules M0, M1, M2, M3, M4, M5, and M6 are found to be operable. It will be recognized that the seven module arrangement shown in FIG. 3 could be the result of a one module failure in an eight module arrangement.

Figure 4:
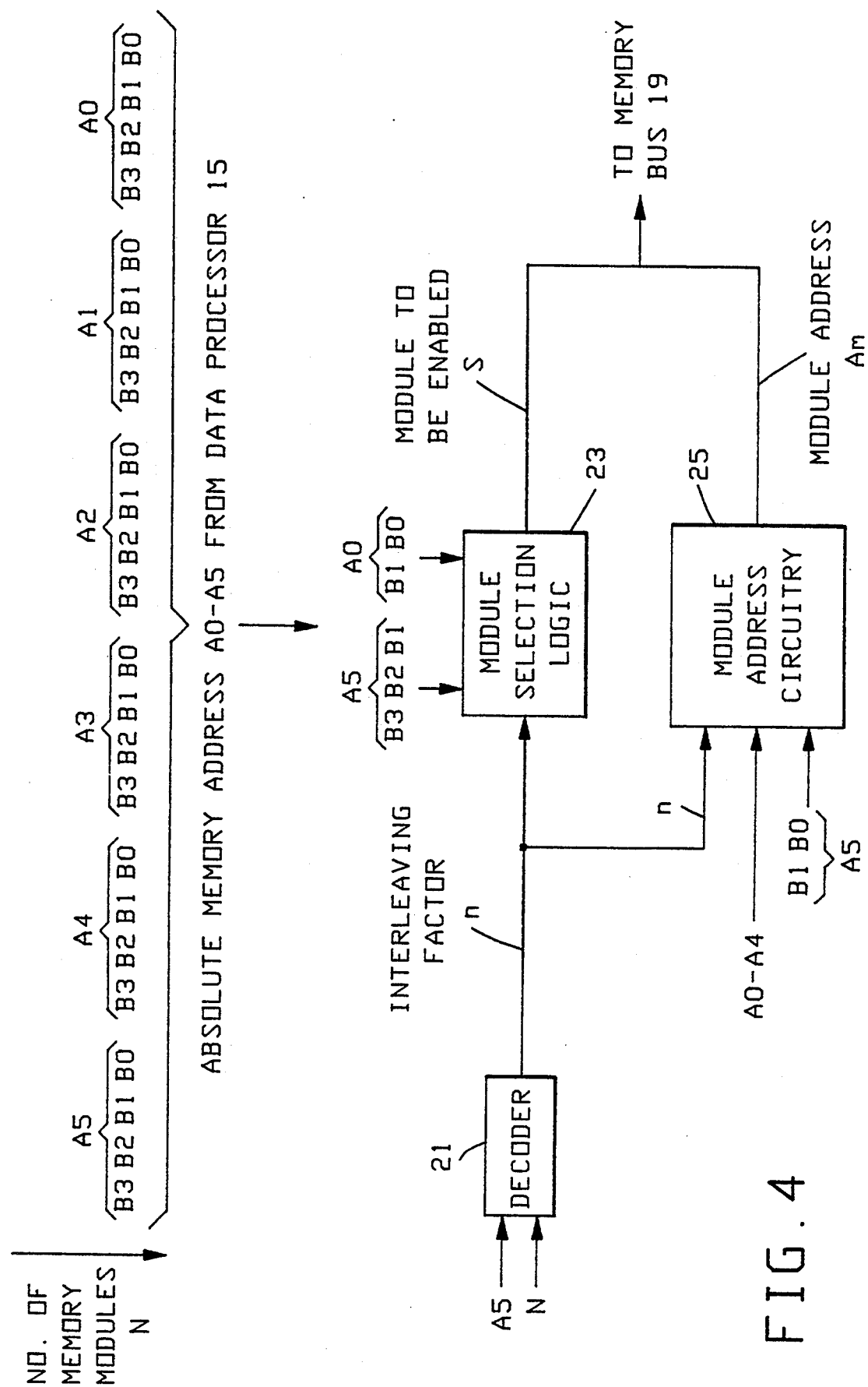
FIG. 4 is an electrical block and schematic diagram illustrating a preferred embodiment of the memory address controller in FIG. 3.

FIG. 4 illustrates a preferred manner for implementing the memory module controller 17 in FIG. 3 so as to provide memory module enabling and addressing in an automatically variable memory interleaving system in accordance with the invention. For the particular preferred embodiment of FIG. 4 being considered herein, it will be assumed that the system shown in FIG. 3 is capable of employing from 1 to 16 memory modules, wherein each memory module provides storage for OF FF FF words (address notation), which is equivalent to 0000 1111 1111 1111 1111 1111 words (binary notation), or 1,048,575 words (decimal notation). The total memory capacity available if all 16 modules were present is thus FF FF FF words (address notation), or 16,777,215 words (decimal notation).

As shown in FIG. 4, an absolute memory address A0-A5 is provided by the data processor 15 indicative of a particular word address contained in one of the modules M0-M6. For the assumed system of FIG. 3, this absolute memory address A0-A5 ranges from 0 to FF FF FF (address), and is representable by six address digits A5, A4, A3, A2, A1, A0, wherein A0 is the least significant address digit, and A5 is the most significant address digit. As shown in FIG. 4, the most significant digit A5 of the absolute memory address A0-A5 is applied to a decoder 21 along with a signal N provided by the data processor 15 indicative of the number of operable memory modules in the system. As mentioned previously, the value of N (which for the FIG. 3 embodiment is seven) is determined in a conventional manner by the data processor 15 during initiation.

Figure 5:
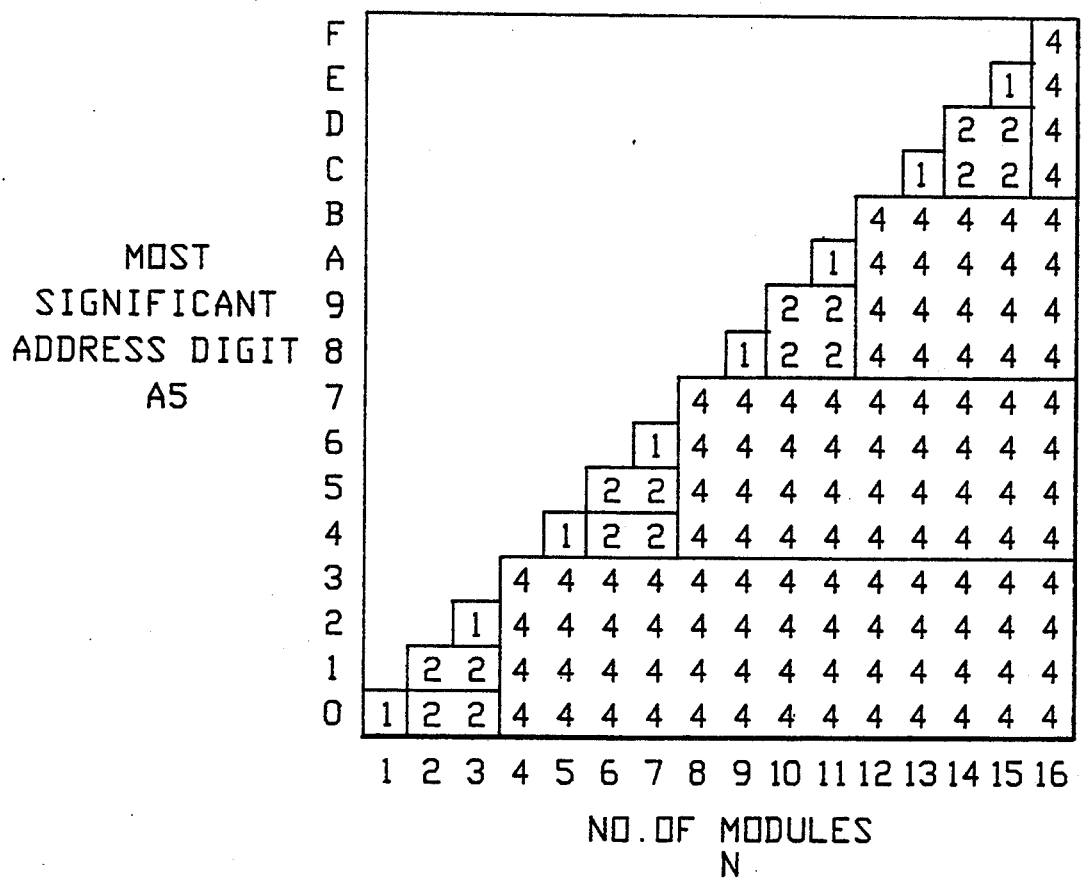
FIG. 5 is a graph illustrating the manner in which the interleaving factor of the module containing the applied memory address is determined in the preferred embodiment of FIG. 4.

The purpose of the decoder 21 in FIG. 4 is to determine, for the number of operable modules N, the interleaving factor n (4-way, 2-way, or 1-way) which will be applicable to the particular memory module containing the address corresponding to the applied absolute memory address A0-A5. The decoder 21 is implemented based on the graph of FIG. 5, which identifies the interleaving factor n using the most significant address digit A5 (that is, the highest four binary bits) of the absolute address (vertical axis) and the number of operable modules N (horizontal axis) determined by the data processor 15 (FIG. 3). For example, for the 7-module system shown in FIG. 3 for which N=7, an applied absolute memory address of 50 00 09 (address) having a most significant address digit of A5=5 will result in the graph of FIG. 5 identifying an interleaving factor of n=2. As another example, if the system is expanded to have 9 modules and the same absolute memory address of 50 00 09 is applied, the most significant address digit will again be A5=5, while N will now be N=9, resulting in an interleaving factor of n=4, rather than n=2 as in a 7-module system.

Next, the memory module controller 17 of FIG. 4 provides for determining the particular one of the seven memory modules M0 to M6 in the system of FIG. 3 which contains the address corresponding to the applied absolute memory address A0-A5. As shown, this is accomplished by applying a signal corresponding to the interleaving factor n (determined by decoder 21) to selection logic 23 along with the three most significant bits B1, B2, B3 of the most significant address digit A5 of the absolute memory address A0-A5, and the two least significant bits B0 and B1 of the least significant address digit A0 of the absolute memory module address A0-A5. As is well known, each address digit corresponds to four binary bits which are designated herein as B0, B1, B2, B3, wherein B0 is the least significant bit. Selection logic 23 operates in response to these applied signals to provide a module enable signal S to memory bus 19 for enabling the particular one of the modules M0 to M6 which contains the address corresponding to the applied absolute memory address A0-A5.

More specifically, selection logic 23 is implemented to operate as follows:

(1) If n=4 (4-way interleaving), or n=2 (2-way interleaving), the selected memory module is determined, by appropriately concatenating bits $B0_{A0}$ and $B1_{A0}$ of address digit A0 with bits $B3_{A5}$, $B2_{A5}$ of address digit A5. For example, for N=7 and an absolute address of 50 00 09, the interleaving factor is n=2 (see FIG. 5) and A0=9 ($B0_{A0}=1$ and $B1_{A0}=0$), and A5=5 (with $B2_{A5}=1$ and $B3_{A5}=0$). Thus, concatenating bits $B0_A$ and $B1_{A0}$ of A0 with $B2_{A5}$ and $B3_{A5}$ of A5 produces a module enable signal $S=B3_{A5}B2_{A5}B1_{A0}B0_{A0}=0101$, which is 5 in decimal. Thus, for an absolute address of 500009 in a system having N=7, an enable signal S=5 is produced which will result in enabling the fifth memory module, which is M4 in FIG. 3.

(2) If n=1 (no interleaving or 1-way interleaving), the selected memory module is determined simply by address digit A5. For example, for a system having N=7 and an absolute address of 7001A2, the interleaving factor is 1 (see FIG. 5), and A5=7. Thus, S=A5=7, which will result in enabling the seventh memory module M6 in FIG. 3.

Having described how the memory module containing the address corresponding to the absolute address is enabled, it will now be described how the module address Am used for addressing this enabled module is determined from the applied absolute memory address A0-A5. This is accomplished in the preferred implementation of FIG. 4 by applying the five least significant address digits A0-A4 and the two least significant bits $B1_{A5}$ and $B0_{A5}$ of address digit A5, along with the interleaving factor n (provided by decoder 21), to module address circuitry 25 which in response thereto provides a module address Am to the enabled module via memory bus 19. The specific manner of operation of the module address circuitry 25 is as follows:

(1) For n=1 (1-way or no interleaving), the five least significant address digits A0-A4 constitute the module address Am. For example, if the 6-digit absolute address is 7001A2, then the module address Am is 001A2.

(2) For n=2 (2-way interleaving), the module address Am is derived by appropriately concatenating the four address digits A4,A3,A2,A1 with the three most significant bits $B3_{A0}$, B2A0, $B1_{A0}$ of address digit A0 and the least significant bit $B0_{A5}$ of address digit A5. This produces a module address Am=A4,A3,A2,A1,$B3_{A0}$,$B2_{A0}$,$B1_{A0}$,$B0_{A5}$. Thus, if the 6-digit applied absolute address is 400009, then the module address Am is 00008.

(3) For n=4 (4-way interleaving), the module address Am is derived by appropriately concatenating the four address digits A4,A3,A2,A1 with the two most significant bits $B3_{A0}$ and $B2_{A0}$ of address digit A0 and the two least significant digits $B1_{A5}$, $B0_{A5}$ of address digit A5. This produces a module address Am=A4,A3,A2,A1,$B3_{A}0B2_{A0}$,$B1_{A5}$,$B0_{A5}$. Thus, if the six-bit absolute address is 50B2F7, then the module address Am is 0B2F5.

Deriving the module enable signal S and module address Am by appropriately concatenating the address bits as described above is advantageous since it can be accomplished simply, economically and at high speed. While such concatenating produces the range of word addresses indicated for each of the modules M0-M6 in FIG. 3, it will be understood that the particular organization of word locations in each module will be dependent upon its interleaving factor. However, this is of no practical consequence since, except for 1-way interleaving (that is, no interleaving), sequential words will be in different modules so that the advantages of interleaving can be achieved.

Figure 6:
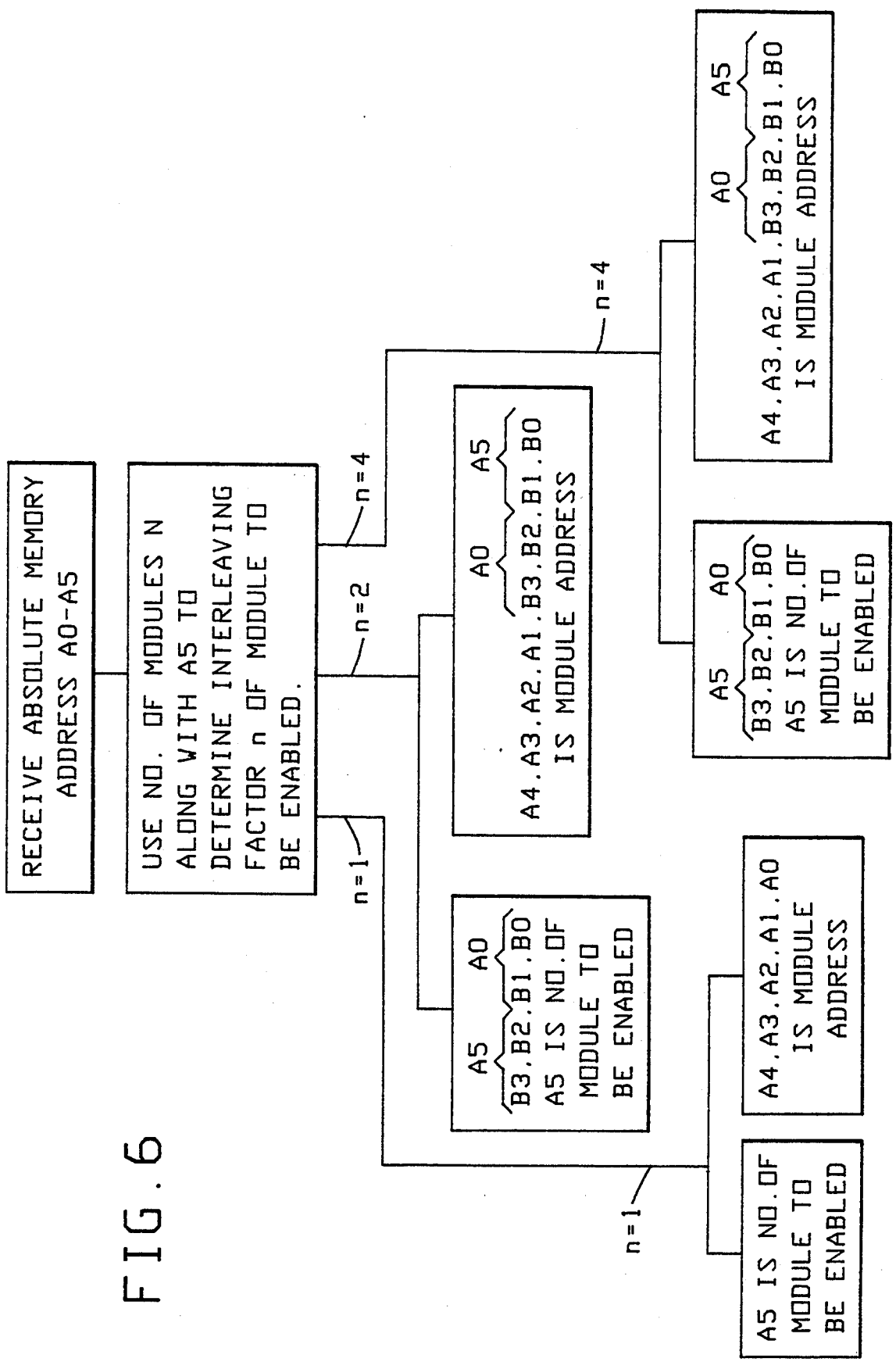
FIG. 6 is a flow chart representation of the operation of preferred embodiment of FIG. 4.

The concatenating and other operations described above for the memory address controller 17 in FIG. 4 are summarized in the flow diagram of FIG. 6.

Although the present invention has been described in connection with particular preferred embodiments of the invention, it is to be understood that various modifications in construction, arrangement and use can be made without departing from the true spirit and scope of the invention. For example, it will be evident from the flow diagram of FIG. 6 that the invention can be implemented using software as well as hardware. The present invention is thus to be considered as including all possible modifications and variations coming within the scope of the appended claims.

What is claimed is:

1. For use in a computer system, improved memory means providing for variable interleaved access thereto in response to memory addresses provided by said computer, said memory means comprising:
a plurality of addressable memory modules; and
a memory address controller for selectively enabling and addressing selected memory modules in a variable interleaved manner in response to memory addresses received from said computer, each memory address comprising a plurality of digits including a most significant digit;
said memory address controller providing for different interleaving factors for different ones of said modules dependent upon the number of available modules including providing for concurrent plural and one-way interleaving to Dermit use of all available modules;
said memory address controller automatically varying the interleaving factors provided for said modules dependent upon the number of modules;
said memory address controller including a decoder, module selection logic, and module address circuitry, said decoder being responsive to the number of available modules and the most significant digit of an applied memory address for producing the interleaving factor applicable to the particular module containing said memory address, said module selection logic being responsive to said interleaving factor and predetermined digits of said memory address for enabling said particular module, and said module address circuitry being responsive to said interleaving factor and predetermined digits of said memory address for accessing the module address in said particular module corresponding to said memory address.

2. The invention in accordance with claim 1, wherein said memory address controller includes means for concurrently providing 4-way, 2-way and 1-way interleaving for said modules in a manner which achieves the maximum interleaving capability for the number of available modules.

3. The invention in accordance with claim 1, wherein the number of modules is at least six, and wherein said memory address controller provides 4-way interleaving for four modules and 2-way interleaving for two other modules.

4. The invention in accordance with claim 3, wherein the number of modules is at least seven, and said memory address controller additionally provides 1-way interleaving for at least one module.

5. The invention in accordance with claim 1, wherein said module address is derived by concatenating predetermined ones of said digits in a manner determined by said interleaving factor.

6. The invention in accordance with claim 5, wherein the particular module to be enabled is derived by concatenating predetermined ones of said address bits.

7. The invention in accordance with claim 1, 2, 3, 4, 5, or 6 wherein the number of available modules is determined at initiation of said system.

* * * * *